(12) United States Patent
Newman

(10) Patent No.: US 11,077,969 B2
(45) Date of Patent: Aug. 3, 2021

(54) SYSTEMS AND METHODS FOR MULTI-STAGE SEALING OF CONTACT LENS PACKAGING

(71) Applicant: MENICON SINGAPORE PTE LTD., Singapore (SG)

(72) Inventor: Stephen D. Newman, Singapore (SG)

(73) Assignee: MENICON SINGAPORE PTE LTD., Singapore (SG)

( * ) Notice: Subject to any disclaimer, the term of this patent is extended or adjusted under 35 U.S.C. 154(b) by 0 days.

(21) Appl. No.: 16/998,594

(22) Filed: Aug. 20, 2020

(65) Prior Publication Data

US 2020/0377246 A1 Dec. 3, 2020

Related U.S. Application Data

(63) Continuation of application No. 14/351,996, filed as application No. PCT/SG2012/000388 on Oct. 18, 2012, now abandoned.

(30) Foreign Application Priority Data

Oct. 18, 2011 (SG) .............................. 201107630-4

(51) Int. Cl.
| | |
|---|---|
| *B65B 25/00* | (2006.01) |
| *A45C 11/00* | (2006.01) |
| *B65B 51/10* | (2006.01) |
| *B65B 51/14* | (2006.01) |
| *B29C 65/00* | (2006.01) |

(Continued)

(52) U.S. Cl.
CPC .......... *B65B 25/008* (2013.01); *A45C 11/005* (2013.01); *B29C 65/18* (2013.01);
(Continued)

(58) Field of Classification Search
CPC ..... B65B 25/008; B65B 7/2878; B65B 51/10; B65B 51/14; B65B 51/22; A45C 11/005;
(Continued)

(56) References Cited

U.S. PATENT DOCUMENTS

| | | | | |
|---|---|---|---|---|
| 3,332,549 A | * | 7/1967 | Powell ................... | B65D 75/26 206/363 |
| 3,343,332 A | * | 9/1967 | Mahaffy .................. | B65B 9/04 53/433 |

(Continued)

FOREIGN PATENT DOCUMENTS

| | | |
|---|---|---|
| CN | 01244833 A | 2/2000 |
| CN | 1244833 C | 3/2006 |

(Continued)

OTHER PUBLICATIONS

Extended European Search Report for European Patent Application No. 12842580.8, dated Oct. 7, 2015 (7 pages).

(Continued)

Primary Examiner — Dariush Seif
(74) Attorney, Agent, or Firm — Dorsey & Whitney LLP

(57) ABSTRACT

A contact lens package includes a first package layer, a second package layer, a lens receiving area defined between the first and second package layers, and first and second seal portions. The first seal portion extends around a first portion of the lens receiving area. The second seal portion extends around a second portion of the lens receiving area. The second seal portion has different sealing properties than the first seal portion. The first seal portion may include a releasable seal between the first and second package layers, and the second seal portion may include a permanent seal between the first and second package layers.

22 Claims, 7 Drawing Sheets

(51) Int. Cl.
| | |
|---|---|
| *B65B 51/22* | (2006.01) |
| *B29C 65/18* | (2006.01) |
| *B65D 75/32* | (2006.01) |
| *B29C 65/76* | (2006.01) |
| *B65B 7/28* | (2006.01) |
| *B29L 11/00* | (2006.01) |
| *B29L 31/00* | (2006.01) |
| *B29C 65/16* | (2006.01) |
| *B29C 65/08* | (2006.01) |
| *B29C 65/04* | (2006.01) |
| *B29C 65/14* | (2006.01) |

(52) U.S. Cl.
CPC ............ *B29C 65/76* (2013.01); *B29C 66/112* (2013.01); *B29C 66/131* (2013.01); *B29C 66/244* (2013.01); *B29C 66/24245* (2013.01); *B29C 66/305* (2013.01); *B29C 66/3452* (2013.01); *B29C 66/53461* (2013.01); *B29C 66/8161* (2013.01); *B29C 66/81463* (2013.01); *B29C 66/8322* (2013.01); *B29C 66/849* (2013.01); *B65B 7/2878* (2013.01); *B65B 51/10* (2013.01); *B65B 51/14* (2013.01); *B65B 51/22* (2013.01); *B65D 75/327* (2013.01); *A45C 2011/006* (2013.01); *B29C 65/04* (2013.01); *B29C 65/08* (2013.01); *B29C 65/1412* (2013.01); *B29C 65/16* (2013.01); *B29C 66/71* (2013.01); *B29C 66/72321* (2013.01); *B29C 66/8242* (2013.01); *B29C 66/8246* (2013.01); *B29L 2011/0041* (2013.01); *B29L 2031/7164* (2013.01)

(58) Field of Classification Search
CPC . A45C 11/006; A45C 2011/006; B29C 65/18; B29C 65/76; B29C 66/112; B29C 66/131; B29C 66/24245; B29C 66/244; B29C 66/305; B29C 66/3452; B29C 66/53461; B29C 66/81463; B29C 66/8161; B29C 66/8322; B29C 66/849; B29C 66/71; B29C 66/72321; B29C 66/8242; B29C 66/8246; B29C 65/04; B29C 65/08; B29C 65/1412; B29C 65/16; B65D 75/327; B65D 75/28; B65D 75/38; B29L 2011/0041; B29L 2031/7164
USPC .......................................................... 53/433
See application file for complete search history.

(56) References Cited

U.S. PATENT DOCUMENTS

| | | | |
|---|---|---|---|
| 3,651,615 A | 3/1972 | Bohner et al. | |
| 4,392,569 A * | 7/1983 | Shoup | A45C 11/005 206/205 |
| 4,691,820 A * | 9/1987 | Martinez | B65D 75/326 206/205 |
| 4,870,800 A | 10/1989 | Kasai | |
| 5,096,052 A | 3/1992 | Raque et al. | |
| 5,155,971 A | 10/1992 | Zopf | |
| 5,375,698 A * | 12/1994 | Ewart | A45C 11/005 206/205 |
| 5,407,070 A * | 4/1995 | Bascos | A61M 5/002 206/364 |
| 5,620,087 A * | 4/1997 | Martin | G09F 3/02 206/5.1 |
| 5,620,088 A * | 4/1997 | Martin | B65B 25/008 206/5.1 |
| 5,623,810 A * | 4/1997 | Dey | B65B 9/04 53/281 |
| 5,649,410 A * | 7/1997 | Martin | G01M 11/0207 53/474 |
| 5,704,468 A * | 1/1998 | Lust | B65D 1/34 206/205 |
| 5,711,416 A | 1/1998 | Bauman | |
| 5,823,327 A * | 10/1998 | Wu | B65D 77/0413 206/5.1 |
| 5,853,085 A * | 12/1998 | Luttrell | A45C 11/005 206/5.1 |
| 6,413,334 B1 * | 7/2002 | Rittner | B30B 15/068 156/64 |
| 6,568,533 B1 * | 5/2003 | Tanaka | B65D 75/30 206/484 |
| 6,994,213 B2 * | 2/2006 | Giard, Jr. | A61M 25/002 206/363 |
| 7,086,526 B2 * | 8/2006 | Newman | B65D 85/70 206/5.1 |
| 7,744,517 B2 * | 6/2010 | Bonenfant | B65D 75/5838 493/223 |
| 7,828,137 B2 | 11/2010 | Newman | |
| 7,832,552 B2 * | 11/2010 | Newman | A45C 11/005 206/5.1 |
| 7,938,255 B2 | 5/2011 | Newman | |
| 7,967,133 B2 | 6/2011 | Newman | |
| 8,061,897 B2 | 11/2011 | Ichikawa et al. | |
| 8,104,608 B2 | 1/2012 | Newman | |
| 9,061,796 B2 * | 6/2015 | Caldwell | B65D 21/0202 |
| 9,668,558 B2 | 6/2017 | Clamp et al. | |
| 2003/0057111 A1 * | 3/2003 | Ichikawa | B65D 77/2032 206/5.1 |
| 2003/0062640 A1 | 4/2003 | Ansell et al. | |
| 2004/0004008 A1 * | 1/2004 | Peck | A45C 11/005 206/5.1 |
| 2004/0112008 A1 | 6/2004 | Voss et al. | |
| 2004/0191353 A1 | 9/2004 | Togo et al. | |
| 2005/0226488 A1 * | 10/2005 | Barry | G01N 21/9508 382/141 |
| 2006/0182909 A1 * | 8/2006 | Ichikawa | B65D 75/5855 428/35.2 |
| 2006/0219577 A1 * | 10/2006 | Newman | B65D 77/02 206/5.1 |
| 2006/0274263 A1 * | 12/2006 | Yacktman | B65D 83/0418 351/159.02 |
| 2007/0033906 A1 * | 2/2007 | Kernick | B65B 25/008 53/485 |
| 2007/0062948 A1 * | 3/2007 | Albrecht | B65D 85/78 220/266 |
| 2007/0089998 A1 * | 4/2007 | Tokarski | A45C 11/005 206/5.1 |
| 2007/0151885 A1 * | 7/2007 | Loyd | A61F 13/55185 206/440 |
| 2008/0053844 A1 | 3/2008 | Newman | |
| 2008/0078681 A1 * | 4/2008 | Newman | B65D 75/20 206/5.1 |
| 2008/0105581 A1 * | 5/2008 | Kondo | B65B 3/003 206/438 |
| 2009/0113851 A1 * | 5/2009 | Carr | B29C 66/849 53/478 |
| 2009/0145091 A1 * | 6/2009 | Connolly | B29D 11/00067 53/467 |
| 2009/0250466 A1 | 10/2009 | Fujimura | |
| 2011/0042243 A1 | 2/2011 | Newman | |
| 2012/0006695 A1 * | 1/2012 | Kawai | B65B 25/008 206/5.1 |
| 2012/0085662 A1 * | 4/2012 | Mori | A61L 12/128 206/205 |
| 2012/0145569 A1 * | 6/2012 | Chew | B32B 27/40 206/205 |
| 2013/0180212 A1 * | 7/2013 | Wang | B29D 11/00125 53/413 |
| 2014/0124405 A1 * | 5/2014 | Tau | C09K 3/1006 206/524.3 |
| 2014/0246337 A1 * | 9/2014 | Newman | B32B 15/088 206/5.1 |
| 2014/0284229 A1 * | 9/2014 | Newman | B65D 77/003 206/213.1 |

(56) References Cited

U.S. PATENT DOCUMENTS

2014/0331602 A1* 11/2014 Newman ................ B29C 65/18
53/405

FOREIGN PATENT DOCUMENTS

| CN | 101400571 A | 4/2009 |
|---|---|---|
| CN | 104024122 B | 6/2016 |
| DE | 102008034493 A1 | 1/2010 |
| EP | 1092645 B1 | 3/2004 |
| FR | 1563407 A | 4/1969 |
| JP | 1176002 | 12/1989 |
| JP | 385225 | 4/1991 |
| JP | 6258603 B2 | 12/2017 |
| WO | 03016175 A1 | 2/2003 |
| WO | 2007104371 A1 | 9/2007 |
| WO | 2009069265 A1 | 6/2009 |

OTHER PUBLICATIONS

Second Office Action for Chinese Patent Application No. 201280062558.1, dated Nov. 4, 2015, English translation (11 pages).
Notification to Grant Patent Right for Invention for Chinese Patent Application No. 201280062558.1, dated Mar. 4, 2016, English Translation (4 pages).
First Examination Report for European Patent Application No. 12842580.8, dated Mar. 16, 2018 (9 pages).
First Office Action for Chinese Patent Application No. 201280062558.1, dated Mar. 27, 2015, English translation (18 pages).
First Search Report for Taiwanese Application No. 101138440, (2 pages).
International Search Report and Written Opinion of the International Searching Authority for International Patent Application No. PCT/SG2012/000388, dated Jan. 23, 2013 (12 pages).
Office Action for European Patent Application No. 12842580.8, dated Mar. 16, 2018 (9 pages).
Office Action for Japanese Patent Application No. 2014-537028, dated Nov. 1, 2016, English translation (4 pages).
Second Search Report issued for Taiwanese Application No. 101138440, dated Mar. 2, 2018, with English translation (4 pages).
Written Opinion of Singapore Application No. 2014014906, dated Jun. 16, 2015 (5 pages).

* cited by examiner

SYSTEMS AND METHODS FOR MULTI-STAGE SEALING OF CONTACT LENS PACKAGING

CROSS-REFERENCE TO RELATED APPLICATIONS

This application is a continuation of U.S. patent application Ser. No. 14/351,996, filed 15 Apr. 2014, entitled "Systems and Methods for Multi-Stage Sealing of Contact Lens Packaging," which claims priority to International Application No. PCT/SG2012/000388, filed 18 Oct. 2012, entitled "Systems and Methods for Multi-Stage Sealing of Contact Lens Packaging," which claims priority to Singapore Patent Application No. 201107630-4, filed 18 Oct. 2011, entitled "Systems and Methods for Multi-Stage Sealing of Contact Lens Packaging," the contents of which are hereby incorporated by reference in their entireties.

TECHNICAL FIELD

The present systems and methods relate to contact lens packaging methods and devices. Specifically, the present disclosure provides methods and apparatuses for sealing contact lens packages in multiple stages.

BACKGROUND

Contact lenses are commonly stored in disposable packages. Particularly, soft disposable contact lenses are often stored in small disposable packages. Due to the sensitive nature of contact lenses, care must be taken that the package is sufficiently durable to ensure sterility. Traditionally blister packaging has been used for disposable lenses consisting of a contact receptacle portion (herein after referred to as a "boat") and a film cover. The boat typically consists of a polypropylene and the cover a multi-layer film comprising polyethylene, aluminum, a bonding agent, and polypropylene. The boat is typically an injected mold plastic capable of limited elastic deflection filled with a sterile saline solution configured to receive a single contact lens.

After the boat is filled with an appropriate aqueous solution, a contact lens is placed within and the film cover is bonded to the boat. The blister pack is then autoclaved using steam and pressure to ensure sterility. The objective is to present a contact lens package to a patient that is aesthetically pleasing, sterile, and easy to open. The packaging is typically used once and then discarded along with the aqueous solution. In order to reduce the overall cost to the patient, the cost and size of the packaging should be kept to a minimum. Additionally, the disposability of the lens packages necessitates conformity with ecological standards, particularly with single-use (or 1-day) contact lenses.

It is necessary that the package be well-sealed to withstand the autoclave process as well as the shipping and handling by patients. For this reason, conventional wisdom in the contact lens industry has been to use preformed stiff packaging for the boat to protect the lens from damage, and a multi-layer film to bond and seal the lens within the boat. Examples of typical traditional blister packs are shown in: U.S. Pat. Nos. 5,704,468; 4,392,569; 5,620,088; 5,620,088; 4,691,820; 5,823,327; 5,853,085; EP Patent Publication No. 1 092 645 A1; EP Patent Publication No. 1 092 645.

Typically, the multi-layer film is bonded to the boat using a high temperature heated press. The sealing heads of the heated press are heated and used to press the film layer against the outer perimeter of the boat. The film layer is bonded along the outer perimeter of the boat. The boat and film layer materials as well as the aqueous solution surrounding the contact become heated and expand during the bonding process. The increase in temperature and volume imparts significant strain on the seal between the film layer and the boat. Consequently, the boat, the film layer, and the seal itself must be sufficiently resilient to withstand the forces created by the expansion during heating, as well as the contraction during cooling. Additionally, if the boat is not large enough or does not contain enough aqueous solution, then the contact lens itself may be compromised.

Further to these effects on the package, a downstream consequence of the aforementioned internal heating phenomenon manifests itself as poor post autoclave aesthetics and potentially compromised package sealing. During the heating and cooling phases in the thermal sterilizing process, the internal contents of the package, particularly the air and aqueous solution, expand and contract at different rates and amounts to the surrounding package. The use of a ballasted autoclave (where external air or water is pumped into the sterilizing chamber at strategic pressure levels and key process times to counter the differential pressure effects) can mitigate this effect somewhat, but does not remove it entirely. Key examples of this phenomenon are crumpled packages and seal leaks. If the overall package has distorted sufficiently, there may be more than one leak in the seal surrounding the lens cavity.

SUMMARY

One aspect of the present disclosure relates to a contact lens package that includes a first package layer, a second package layer, a lens receiving area defined between the first and second package layers, and first and second seal portions. The first seal portion extends around a first portion of the lens receiving area. The second seal portion extends around a second portion of the lens receiving area. The second seal portion has different sealing properties than the first seal portion. The first seal portion may include releasable seal between the first and second package layers, and the second seal portion may include a permanent seal between the first and second package layers.

Another aspect of the present disclosure relates to a press adapted to seal a contact lens package. The press includes first, second and third portions. The first portion is configured to support at least one contact lens package, wherein the contact lens package includes a lens receiving area sized to hold a contact lens. The second portion includes at least one first sealer configured to create a first seal portion around only a portion of the lens receiving area. The third portion includes at least one second sealer configured to create a second seal portion around a different portion of the lens receiving area. The second seal portion has different sealing properties than the first seal portion.

A further aspect of the present disclosure relates to a method for manufacturing a contact lens package. The method includes providing first and second package layers that define a lens receiving area there between, forming a first seal portion around all but a portion of a periphery of the lens receiving area, and forming a second seal portion to completely seal closed the lens receiving area. Forming the second seal portion may include forming the second seal portion with a greater seal strength than a seal strength of the first seal portion.

Another example method in accordance with the present disclosure relates to a method of manufacturing a contact lens package that includes positioning a first package layer on a first press portion, positioning a contact lens on the first package layer, and positioning a second package layer on the first package layer and covering the contact lens. The method also includes creating a first seal portion between the first and second package layers with a second press portion, and creating a second seal portion between the first and second package layers with a third press portion. The first and second seal portions may have different properties.

A further aspect of the present disclosure relates to a method of assembling a contact lens package. The method includes arranging first and second foil package layers at least partially overlapping each other with a contact lens positioned there between, creating a first sealed portion between the first and second foil package layers, and creating a second sealed portion between the first and second foil package layers. The contact lens may be positioned in a lens receiving area defined between the first and second foil package layers, and creating the first sealed portion may include sealing around all but a gap portion of a periphery of the lens receiving area, and creating the second seal includes sealing the gap portion.

BRIEF DESCRIPTION OF THE DRAWINGS

The accompanying drawings illustrate various embodiments of the principles described herein and are a part of the specification. The illustrated embodiments are merely examples and do not limit the scope of the disclosure.

In the drawings, identical reference numbers identify similar elements or acts.

DETAILED DESCRIPTION

Figure 1:
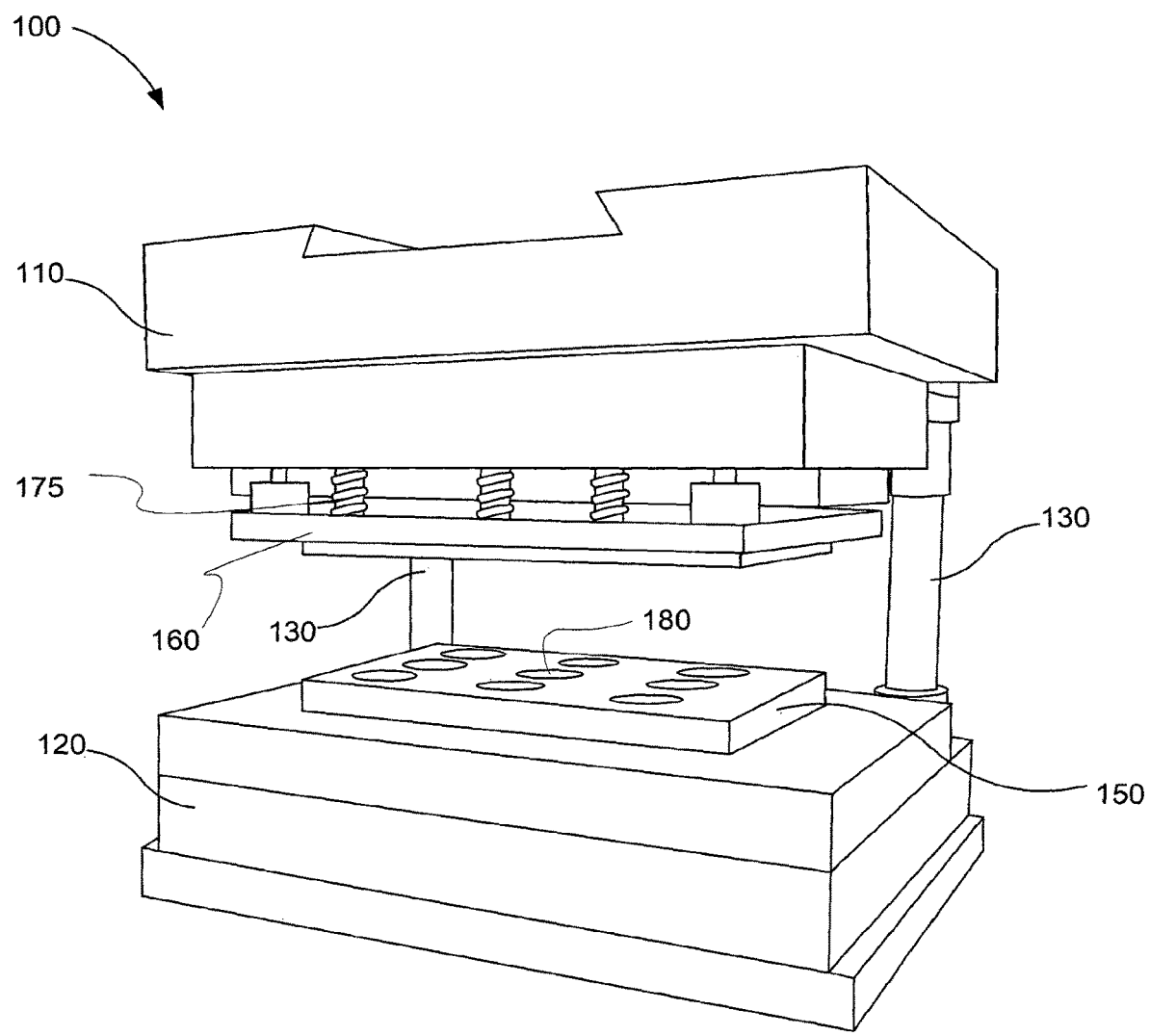
FIG. 1 is an exemplary schematic illustrating a heated press having multi-stage sealing heads according to one exemplary embodiment.

The present disclosure provides several systems and methods for sealing a contact lens within a package. Specifically, a method for sealing a contact lens within a package is described that minimizes detrimental thermal effects of a sealing process by sealing the package in at least two stages. The presently described systems and methods for packaging a contact lens may be different in many respects from a traditional blister pack contact lens package. For example, the systems and methods of the present disclosure provide sealing of a package in multiple stages. Furthermore, because of the decreased thermal stress on the package, the present systems and methods provide a sealing method that permits foil-on-foil packaging to be used.

While many traditional systems utilize a heated press to seal a top layer onto a bottom "boat" layer, traditional systems do not utilize multiple stages. Consequently, as the top layer is sealed using heat and pressure to the bottom layer, the aqueous solution and the gasses within the boat become heated and expand. Due to the relatively large amount of space and material in a traditional boat type configuration, the expansion can, for the most part, be absorbed by the package. However, this expansion does cause significant stress on the packaging material as well as the seal itself. For at least this reason, robust packaging materials must be used in the traditional systems and methods to ensure sterility and a durable seal. The present systems and methods, by allowing expanding gases to escape during the first sealing stage, allow for less robust materials to be used while maintaining a high assurance of sterility and appropriate sealing.

A heated press is described similar to heated presses used in traditional contact lens blister pack production. The heated press and its function are not unique to the present system and methods and are consequently not described in great detail. Various traditional heated presses are suitable for use with the present systems and methods. These traditional presses may be adapted for multi-stage packaging of foil-on-foil contact lens packages by adapting the press sealing heads.

According to one exemplary embodiment, a press sealing head suitable for multi-stage sealing of contact lens packages is configured to seal around the perimeter of the contact lens container or lens receiving area, leaving at least one small gap in the perimeter unsealed. This gap allows fluids (e.g., expanding gases and, if desired, liquids) to escape during the first stage of sealing, thereby reducing the internal pressure of the pack. A corresponding second stage of sealing will seal the gap shut. Due to the small size of the gap, the second stage of sealing will not significantly thermally impact the packaging or its contents.

According to various embodiments, the first and second stages of sealing are performed using the same press sealing head. According to alternative embodiments, separate press sealing heads are configured for each stage of sealing. Furthermore, according to alternative embodiments, more than two stages of sealing are performed to complete the seal around the outer perimeter of the boat. Furthermore, according to alternative embodiments, the sealing parameters of the process are different from the first seal to the second seal.

According to several embodiments, pre-formed bottom layers of varying materials are configured with contact lens receptacles (hereinafter referred to as boats). According to other embodiments the receptacles in the bottom layers are formed during the sealing process. For example, the bottom layer in a foil-on-foil process may comprise a generally flexible foil material that permits the foil to be pulled under vacuum into a desired shape using a lower sealing head with a vacuum hole defined therein. Alternative embodiments utilize a small vacuum hole in the bottom of each receptacle in the lower sealing head to maintain accurate positioning of the contact lens, fluid, and any other elements in the package, for creating a precise seal around the perimeter of the boat.

Alternative embodiments of sealing heads are possible. According to various embodiments, a number of configurations for a first sealing stage are possible. Many variations are possible where a top layer of packaging is sealed around the perimeter of a boat formed in a bottom layer of the packaging where one or more gaps are created in the seal. Subsequent sealing stages seal each of these gaps to complete the seal around the perimeter.

In the following description, certain specific details are set forth in order to provide a more complete understanding of various embodiments of the present systems and methods for sealing contact lens packages in multiple stages. However, one skilled in the relevant art will recognize that the present exemplary systems and methods may be practiced without one or more of these specific details, or with other methods, components, materials, etc. In other instances, well-known structures associated with heated press systems and blister pack creation have not been shown or described in detail to avoid unnecessarily obscuring descriptions of the present exemplary embodiments.

Unless the context requires otherwise, throughout the specification and the claims that follow, the word "comprise" and variations thereof, such as, "comprises" and "comprising" are to be construed in an open, inclusive sense, that is, as "including, but not limited to."

Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment. Furthermore, the particular features, structures, or characteristics may be combined in any suitable manner in one or more embodiments.

While two distinct sets of upper sealing heads are described herein, one of ordinary skill in the art will recognize that many variations are possible for multi-stage sealing of a primary contact lens package. Additionally, while the present system and method may be adaptable for use with traditional blister packs and the material typically used in those processes, the present disclosure also allows for the use of foil-on-foil packaging and any other suitable contact lens packaging that includes a perimeter seal. Traditional systems and methods for sealing blister packs are substantially less compatible with foil-on-foil packaging as they introduce too much thermal stress. Example foil-on-foil packaging and related systems and methods are disclosed in U.S. Pat. No. 7,828,137, which is hereby incorporated in its entirety by this reference. Other features and functionality related to lens packages are described in Singapore Patent Application filed on 18 Oct. 2011 and entitled "Packaging for Disposable Soft Contact Lenses Having Pre-Formed Multi-Layer Structural Laminate", which patent application is incorporated herein in its entirety by this reference.

As disclosed in the above-mentioned Singapore Patent Application entitled "Packaging for Disposable Soft Contact Lenses Having Pre-Formed Multi-Layer Structural Laminate", a primary lens package may include a preformed laminate substrate. One layer of the laminate substrate is configured to provide sufficient structural rigidity to maintain a shape (e.g., a lens receiving portion) that is preformed in the substrate. In one example, the first layer includes a polymer material such as polypropylene. Another layer of the laminate substrate may include a second material that provides different properties from the first-layer such as, for example, light-reflectivity, strength, and resistance to water/vapor permeability. The package also includes a cover sheet that is connected to the substrate and seals a contact lens within a lens receiving portion formed in the substrate. The cover sheet may also be a laminate having at least two layers. The first layer may comprise, for example, a polymer that assists in connecting the cover sheet to the substrate. Another layer of the cover sheet may include a material having different properties such as, for example, greater light-reflectivity, strength, or resistance to water/vapor permeability properties.

A further aspect related to the primary lens package is directed to a single contact lens package that houses multiple contact lenses. The contact lens package may include a plurality of lens receiving portions (e.g., recesses, depressions or "boats") formed in the substrate. The lens receiving portions may be arranged in multiple directions such as multiple rows, wherein each row includes at least one contact lens receiving portion. The rows may be arranged opposite each other or side-by-side. Some contact lens packages may provide for separation of at least one lens receiving portion from the other lens receiving portions. Other arrangements may include a plurality of lens receiving portions that are inseparable from each other once the contact lens package is assembled.

Some primary contact lens packages may include layers of material for the cover sheet and substrate that are added during assembly of the contact lens package rather than being provided with the substrate and/or cover sheet as a laminate. In one example, at least one layer of light-reflective material or liquid/vapor impermeable material is added to the substrate or the cover sheet after sealing a contact lens within a lens receiving portion of the substrate.

The primary lens package may include an internal member that is disposed within the lens receiving portion along with a contact lens. The internal member may help compress the contact lens within the lens receiving portion to decrease a side profile (e.g., depth) of the contact lens from a sagittal depth to compressed depth. Alternatively, the internal member may reliably position the lens within the lens receiving portion or aid in the return of the lens from a compressed state to an uncompressed state. The internal member may be secured within the lens receiving portion or, alternatively, may be free floating within the lens receiving portion of the primary contact lens package. The internal member and portions of the substrate (e.g., lens receiving portion) may include a plurality of perforations that provide a more advantageous interface with some types of contact lenses. Compressing the contact lens within the contact lens package may make it possible to provide the contact lens package with a reduced overall thickness, which may provide a number of advantages related to packaging, storing, and shipping the contact lens package.

The primary lens packages may be created in a single manufacturing line. The substrate and sheet may comprise materials capable of maintaining a sterile environment the package where the lens is disposed. The sterile environment may be created by heating the first material of the substrate. Light-sensitive materials disposed within the package may also be protected from light to limit degradation of the light-sensitive materials. The substrate and cover sheet may comprise materials that permit printing of graphics that minimize negative effects on the light-reflecting attributes or the sterile environment of the contact lens package. In some arrangements, the contact lens package may be configured for use as an insertion aid. The materials of the contact lens package may promote improved sealing between the substrate and cover sheet layers. For example, the laminate materials used for at least one of the substrate and cover sheet may include layers of material in the area where a seal is formed between the substrate and cover sheet that provide improved seals (e.g., releasable seals, permanent seals, hermetic seals, heat seals, etc.).

Also of note is that the present systems and methods increase the likelihood of preserving sterility and of creating a lasting seal. A general heated press is described followed by exemplary upper and lower sealing heads. An exemplary contact lens package is described that may be created using the systems and methods described herein. Further, an exemplary process for multi-stage sealing is described. The following specific details of the present system and method provide a more thorough understanding of a multi-stage sealing process for contact lens packaging. However, many variations are possible and are likely to be used in practice to obtain maximum efficiency within the sealing process.

FIG. 1 illustrates a heated press (100) commonly used to create and/or form packages for contact lenses. The present systems and methods for sealing a contact lens package in multiple stages may utilize any of a wide variety of heated presses similar to that heated press (100) shown in FIG. 1. However, for illustrative purposes, FIG. 1 provides an exemplary embodiment of a suitable heated press (100). The exemplary heated press (100) comprises a lower platform (120) and an upper platform (110) connected by posts (130). Each platform (110, 120) is fitted with a sealing head (150, 160). The lower platform (120) has a lower sealing head (150) configured to receive a preformed bottom portion of a package within a plurality of contact lens receptacles (180). The upper platform (110) is fitted with an upper sealing head (160). The upper sealing head (160) is connected to the upper platform (110) via a plurality of springs (175) and other connection members. While the present exemplary sealing heads (150, 160) are described as a lower and upper sealing head, respectively, it will be understood that the sealing heads are interchangeable and may operate in juxtaposed or any number of alternative orientations.

The heated press (100) is operable to bring the upper sealing head (160) in contact, or almost in contact, with the lower sealing head (150). According to various embodiments, at least portions of the lower and upper sealing heads (150, 160) are heated. In conjunction with the springs (175) and other connecting members of the heated press (100), the amount of force exerted on the packaging materials between the upper and lower sealing heads (150, 160) is controlled very accurately by way of either pneumatics or servo control actions. Precise control of the lower and upper sealing heads (150, 160) is important because the sealing of a foil on foil pack is critical. Unlike a traditional blister boat that is made from PP and is soft enough to absorb some surface irregularities to complete a successful seal, a foil on foil pack cannot take up any irregularities in the seal or substrate surfaces. Rather, the foil on foil pack is controlled via external processes/tools in order to ensure a safe and even seal is achieved The heated press (100) may be configured with a sealing head capable of sealing, at least partially, a plurality of contact lenses at one time. This can be seen as the lower sealing head (150) is configured with nine contact lens receptacles (180). However, it should be understood that any number of alternative heated presses are suitable for use with the present systems and methods. Moreover, the size and number of packages sealed with each press may vary as well. That is, a heated press that is capable of sealing any number of packages at a time will likely be used to increase production and efficiency.

A brief description of a sealed contact lens package will be given in conjunction with FIGS. 3A-3C and 6A-6C to explain an example sealing process before returning to FIGS. 2A and 2B.

Figure 3A:
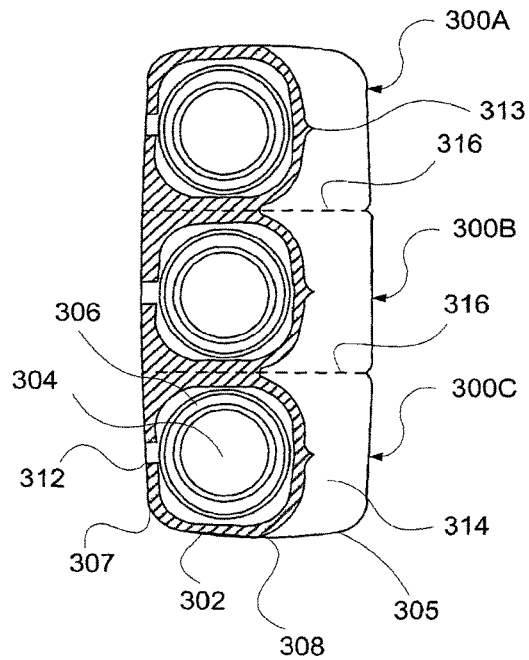
FIG. 3A is a top view of a contact lens package sealed with the upper sealing heads of FIGS. 2A and 2B according to a first sealing stage.

FIG. 3A illustrates a top view of a set of contact lens packages (300A-300C) according to a first sealing stage. The contact lens packages (300A-300C) may be separable along perforations (316). Each of the contact lens packages (300A-300C) includes a first package layer (301), a second package layer (not shown), a lens receiving area (302), a contact lens (304), a support disc (306), and a first seal portion (308). The first seal portion (308) extends around a periphery of the lens receiving area (302) to seal the first package layer (301) to the second package layer. The first seal portion (308) is a peelable seal that may include a sacrificial peel layer to facilitate the separation of the first package layer (301) from the second package layer. As illustrated, the first seal portion (308) includes a peel release portion (313) or point that may provide an easier release of the first seal portion (308) when separating the first package layer (301) from the second package layer (not shown).

The first seal portion (308) may have a gap (312) defined therein where no seal is present. The contact lens packages (300A-300C) may be compressed after forming the first seal portion (308) to remove fluids (e.g., gases) from the lens receiving area (302) prior to closing the gap (312). The contact lens packages (300A-300C) have an unsealed portion (314) along a front end (305) to define one or more user separation tabs so that the first package layer (301) and second package layer may be more easily grasped by a user when opening the contact lens package.

Figure 3B:
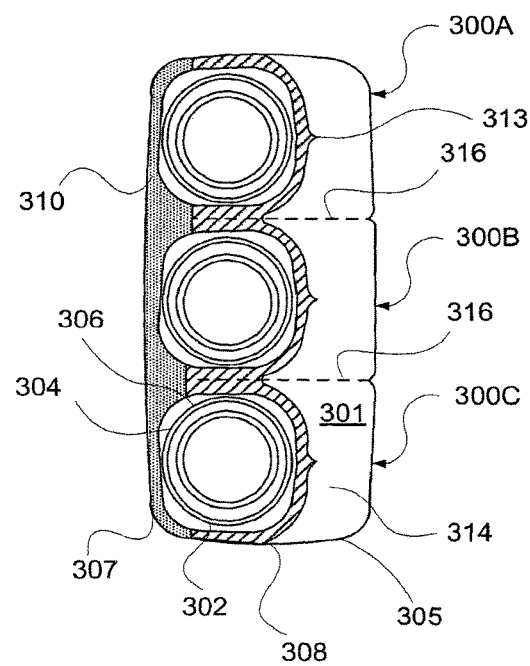
FIG. 3B is a top view of the contact lens package of FIG. 3A sealed with the upper sealing heads of FIGS. 2A and 2B according to a second sealing stage.

FIG. 3B illustrates a top view of the contact lens packages (300A-300C) according to a second sealing stage. In the second sealing stage, a second seal portion (310) is provided along a rear end (307) of the contact lens package at a location that overlaps and seals closed the gap (312). The first and second seal portions (308), (310) may have different characteristics (e.g., releasable versus permanent). The different characteristics of the first and second seal portions (308), (310) may assist a user in opening the contact lens package and maintaining the first package layer (301) connected to the second package layer after opening.

Figure 3C:
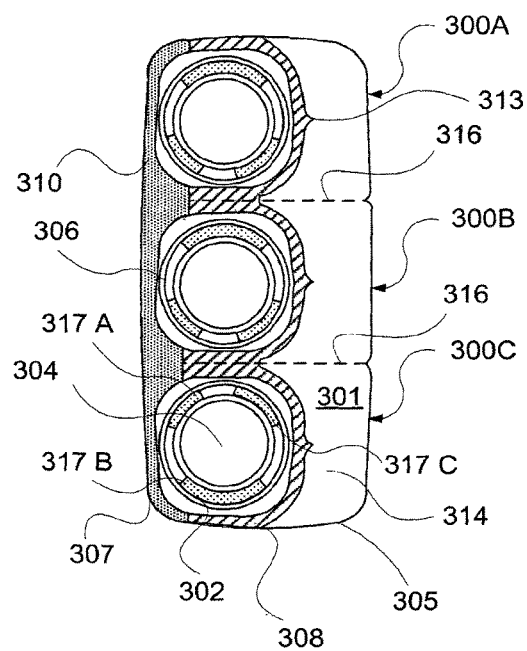
FIG. 3C is a top view of the contact lens package of FIG. 3B having additional seals formed with a support disc of the contact lens package according to a third sealing stage.

FIG. 3C illustrates a top view of the contact lens packages (300A-300C) according to a third sealing stage. In the third sealing stage, a third seal portion (317A-317C) is provided along at least a portion of the support disc (306). The third seal portion (317A-317C) may be formed between the support disc (306) and the first package layer (301), may be formed between the support disc (306) and the second package layer (not shown), or may be formed between the support disc (306) and both the first package layer (301) and second package layer. The third seal portion (317A-317C)

may include multiple seal locations around a periphery of the support disc (306), may be defined at a single seal location around a limited portion of the perimeter, or may extend completely and continuously around the perimeter.

The third seal portion (317A-317C) may be formed using different sealing techniques than the heated press described with reference to FIGS. 2A and 2B. In one example, the third seal portion (317A-317C) may be formed using, for example, ultrasonic welding, laser welding, infrared (IR) bonding, or other techniques that may have a lower risk of damaging the contact lens (304) during the third sealing stage. Additionally, according to one exemplary embodiment, the third seal portion (317A-317C) may be performed at any stage in the manufacturing process of the exemplary primary package. Specifically, the third seal portion (317A-317C) may be performed prior to the assembly of the package or after insertion and sealing of a contact lens within the primary contact lens package. Sealing the support disc (306) to at least one of the top and bottom package layers may, for example, improve discharge of the contact lens (304) from the contact lens package and may maintain assembly of the support disc (306) with the contact lens package after opening the contact lens package. Any one of the first, second and third sealing portions (308), (310), (317A-317C) may be formed using multiple sealing stages.

Figure 6A:
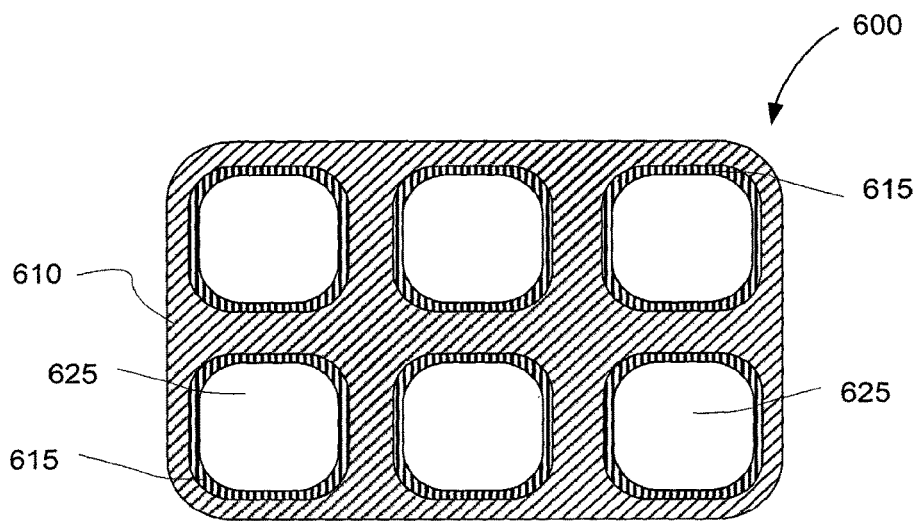
FIG. 6A is a top view of a contact lens package sealed using one method described herein according to one exemplary embodiment.

FIG. 6A illustrates a top view of a sealed contact lens package (600) according to an alternative embodiment. As illustrated, a top package layer (610) has been sealed with a seal (615) around the outer perimeter of each of the boats (675) of a bottom package layer (650) (see FIG. 6B). The top package layer (610) is sealed around the perimeter of the boat (675) and includes a cover portion (625) that extends over the boat (675).

Figure 6B:
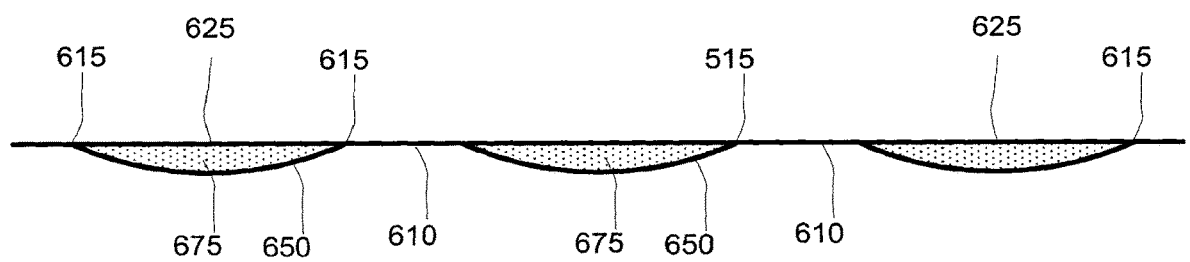
FIG. 6B is a side view of a contact lens package sealed using one method described herein according to one exemplary embodiment.
Figure 6C:
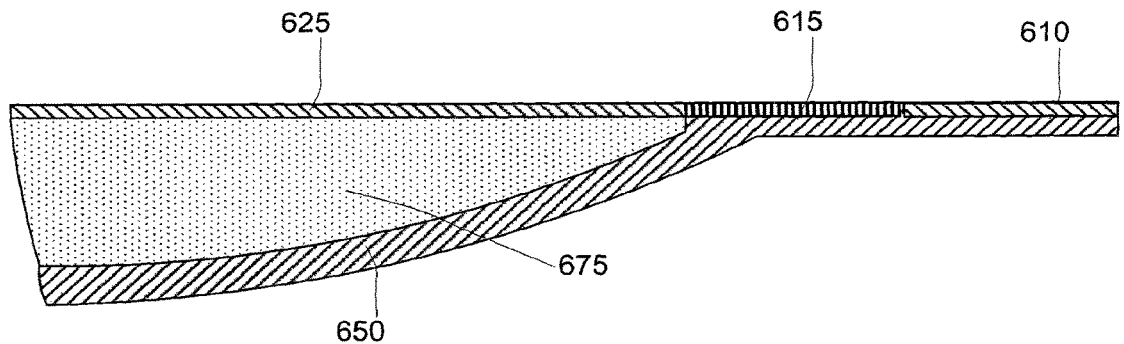
FIG. 6C is a cut-away view of a contact lens package illustrating a sealed lens receptacle according to one exemplary embodiment.

FIGS. 6B and 6C illustrate a cross-section view of the sealed bottom package layer (650) and the boats (675). The top package layer (610) is placed over the bottom package layer (650) with the cover portions (625) extending over the boats (675). The top package layer (610) is sealed around the perimeter of the boats (675) with the seal (615). Additional seals having different characteristics or properties may be formed between the top package layer (610) and the bottom package layer (650). The additional seals may at least partially overlap the seal (615). In some embodiments, the seal (615) may include a gap (e.g., see-gap (312) in FIGS. 3A-3C) that is sealed closed in a second sealing step. In another embodiment, a seal may be formed between a support disc or other structure retained within the boats (675) and one of the top and bottom package layers (610), (650). FIGS. 6A-6C will be described in greater detail below; however this general understanding of the contact lens package is useful for understanding the purpose and function of the sealing heads and the method of multi-stage sealing.

Returning now to FIGS. 2A and 2B, the drawings are essentially identical with FIG. 2B being a top plan view of an upper sealing head (200) and FIG. 2A illustrating the upper sealing head (200) in an isometric view. The drawings are discussed in tandem as a description of the upper sealing head (200) applies to both figures equally.

Figure 2A:
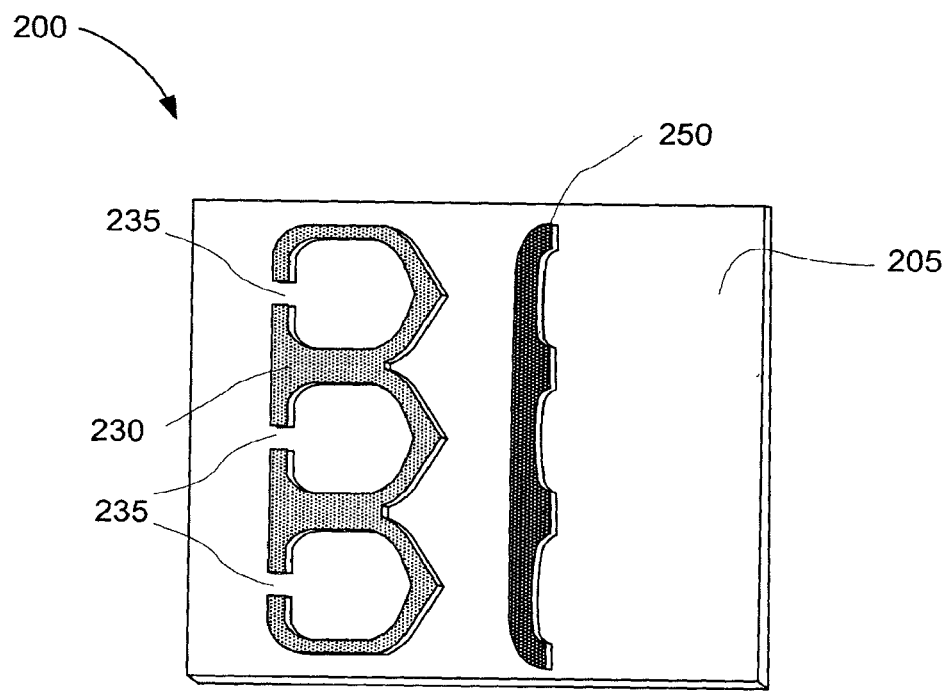
FIGS. 2A and 2B are schematics illustrating upper sealing heads having a row of first-stage sealers and a row of second-stage sealers according to one exemplary embodiment.
Figure 2B:
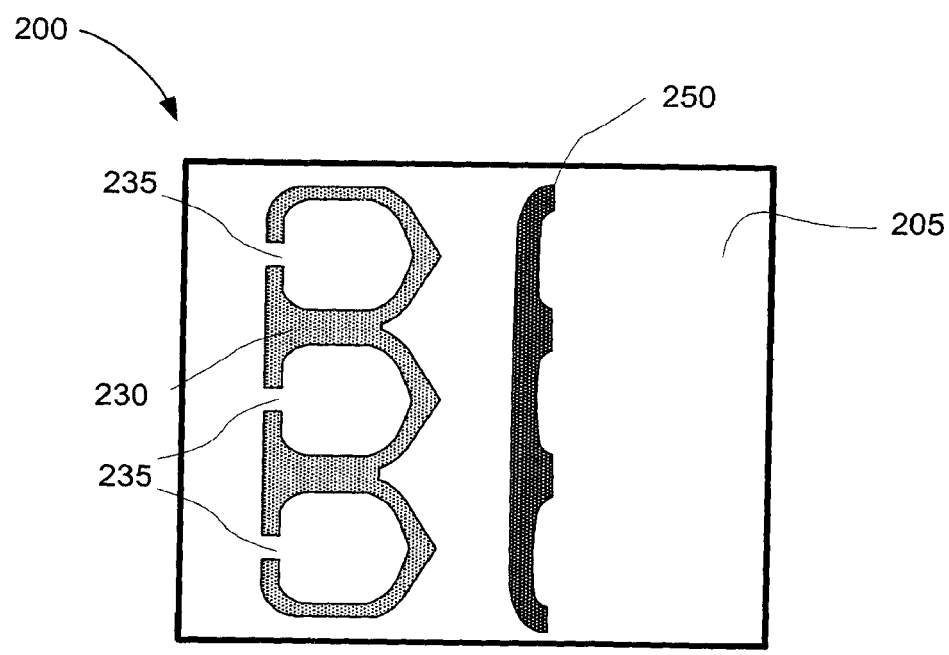

The upper sealing head (200) may include a row of first stage sealers (on the left in FIGS. 2A and 2B) and a row of second stage sealers (on the right in FIGS. 2A and 2B). The first stage of sealing, according to one exemplary embodiment, is configured to seal the top layer of packaging around the perimeter of the boat formed in the bottom layer of packaging. While the boats in FIG. 5A appear as rounded squares, the boat shape may be that of any of a variety of shapes. As illustrated in FIGS. 2A and 2B, the seal will be flat or linear on one side and a triangular shape on the other side. Regardless of what shape is used, the first stage of sealing is intended to seal the top layer of packaging around the boat formed in the bottom layer of packaging while leaving a gap (235) in the seal for fluids (e.g., expanding gasses and/or liquids) to escape.

The sealing platform (230) of the first stage of sealing forms a boat defining seal leaving only the gap (235) in the raised platform associated with each boat. The sealing platforms are heated and operable to compress the top package layer against the bottom package layer to bond the two layers together.

The heat generated during the first stage of sealing may cause some liquid and gas within the boat to expand. The gap (235) leaves a portion of the seal incomplete. This gap (235) in the seal allows expanding gasses and liquids to escape thereby limiting these same fluids from exerting stresses on the packaging materials and the seal. In addition, because the hot expanding gases and liquids are allowed to escape, the partially sealed contact lens package may cool relatively quickly.

According to one exemplary embodiment, a second row of sealers is also illustrated on the left side of the upper sealing head (200). The sealing platform (250) of the second stage of sealing corresponds to the gap (235) left in the first stage of sealing. That is, the sealing platform (250) will complete the seal around the boat by sealing closed the gap (235). In the second stage, the packaging is aligned relative to the sealing platform (250). Once positioned, the sealing platform (250) operates to compress the top and bottom package layers together in the location of the gap (235) and applies energy to complete sealing together of the top and bottom layers of packaging. As noted previously, the sealing portions of the sealing heads may generate seals by selectively imparting any number of energies to the package including, but in no way limited to, thermal energy, ultrasonic energy, radio frequency (RF) energy, or infrared (IR) energy.

Alternative embodiments of such sealing heads may include more than two stages. As illustrated in FIGS. 2A and 2B the seal is completed in two stages. However, it may readily be understood that sealing stages leaving two, three, or more gaps may potentially be sealed in two, three, or more stages.

The shape, size and other aspects of the first and second seal portions (308), (310) shown in FIGS. 3A-3B may result from the construction and operation of the sealing platforms (230), (250). The sealing platform (230) may provide the first seal portion (308) that extends around substantially all of a periphery of the lens receiving area (302) of the contact lens packages (300A-300C) (see FIG. 3A). The gap (312) may be defined by the size and shape of the gap (235) of the sealing platform (230). The gap (312) may be configured to help control the flow of gases and liquids relative to the lens receiving area (302) where the contact lens (304) is retained during the various sealing stages. In one example, fluids are expelled from the lens receiving area (302) through the gap (312) after the first seal portion (308) is formed and before and during formation of the second seal portion (310).

The sealing platform (250) may provide the second seal portion (310) around a different portion of a periphery of the lens receiving area (302) (see FIG. 3B). The second seal portion (310), together with the first seal portion (308), may complete a seal around an entire periphery of the lens receiving area (302). The second seal portion (310) may cover or overlap the gap (312). The second seal portion (310) may have different characteristics and properties as compared to the first seal portion (308). For example, the second seal portion (310) may have a different seal strength than the first seal portion (308). In one embodiment, the second seal portion (310) has a greater seal strength than a seal strength of the first seal portion (308) and may be configured as a permanent seal that is not intended to separate, while the first seal portion (308) provides a releasable seal.

The first and second seal portions (308), (310) may be formed using different applications of heat, pressure and other conditions in connection with use of the sealing platforms (230), (250). For example, the second seal portion (310) may be formed using a greater heat and/or a greater pressure associated with use of the sealing platform (250) than the heat and/or pressure associated with use of the sealing platform (230). In other examples, different materials may be used in the first package layer (301) or second package layer, or additional layers positioned there between, in the area of the first or second seal portions (308), (310) to provide different sealing characteristics.

Figure 4A:
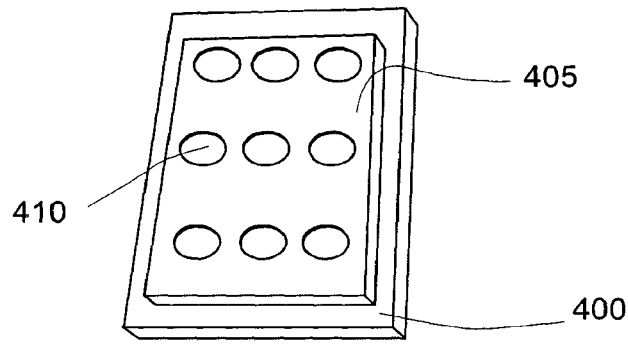
FIG. 4A is a schematic illustrating a lower sealing head according to one exemplary embodiment.
Figure 4B:
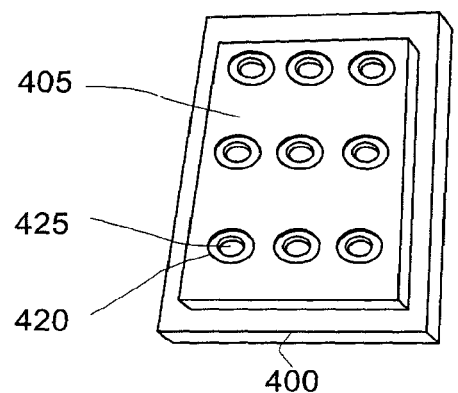
FIG. 4B is a schematic illustrating a lower sealing head having a contact lens receptacle according to one exemplary embodiment.
Figure 4C:
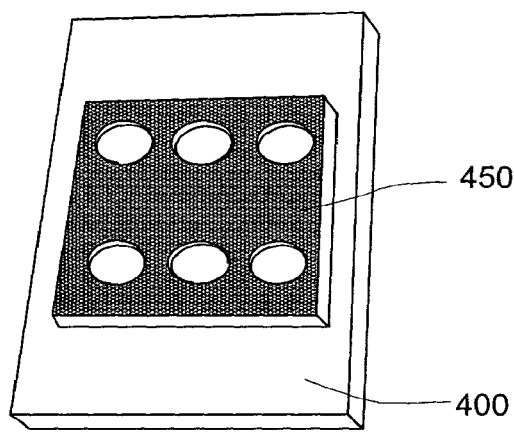
FIG. 4C is an alternative embodiment of a lower sealing head having six orifices according to one exemplary embodiment.

FIGS. 4A-4C illustrate various embodiments of a lower sealing head configuration and manufacturing platform, according to one exemplary embodiment. The configuration of FIG. 4A includes a lower sealing head having a base (400), a raised platform (405), and indentations (410) corresponding to the boats of a bottom layer of packaging. The indentations (410) are configured to receive the boat portion of the bottom package layer. The raised platform (405) will support the package layer as an upper sealing head (e.g., see FIG. 2A), through compression and heat, bonds the upper layer of packaging to the lower layer of packaging.

FIG. 4B differs in that a base (400) and a raised platform (405) are configured with first and second indentations (420, 425). A first, larger indentation (420) is configured to receive a lower layer of packaging material that includes the boat portion. A second, deeper indentation (425) is configured to receive the boat portion of the bottom package layer. The first and second indentations (420, 425), according to various embodiments, serve to accurately position the boat and ensure a proper seal is created. The upper sealing head seals against the raised platform (405). The sealing platforms may be configured to enter into the first indentation (420) and seal against the bottom of the first indentation (420) while the boat remains within the second indentation (425).

FIG. 4C illustrates an adsorbing layer (450) formed on the bottom seal plate configured to adsorb the potential of an uneven seal over multiple seal heads. According to one exemplary embodiment, the adsorbing layer is formed of a silicone.

Furthermore, according to one exemplary embodiment, the bottom of the indentations may include alignment features and/or an orifice used to create a vacuum. According to one exemplary embodiment, the vacuum created may be used to maintain the position of the packaging during a sealing event and/or to contribute to the shaping of the package. Alternatively, any number of orifices or other vacuum sources may be formed in bottom of the indentations to mold a bottom layer of packaging into the desired boat shape or merely to retain the lens and solution during a sealing process, in the case of a flexible bottom substrate. That is, a bottom layer of packaging may include a substantially flat sheet, and when positioned on the lower sealing head a vacuum force may form the packaging material into the desired permanent or temporary shape. While the illustrated indentations are substantially circular, modifications may be made to create a desired non-cylindrical shapes.

Figure 5A:
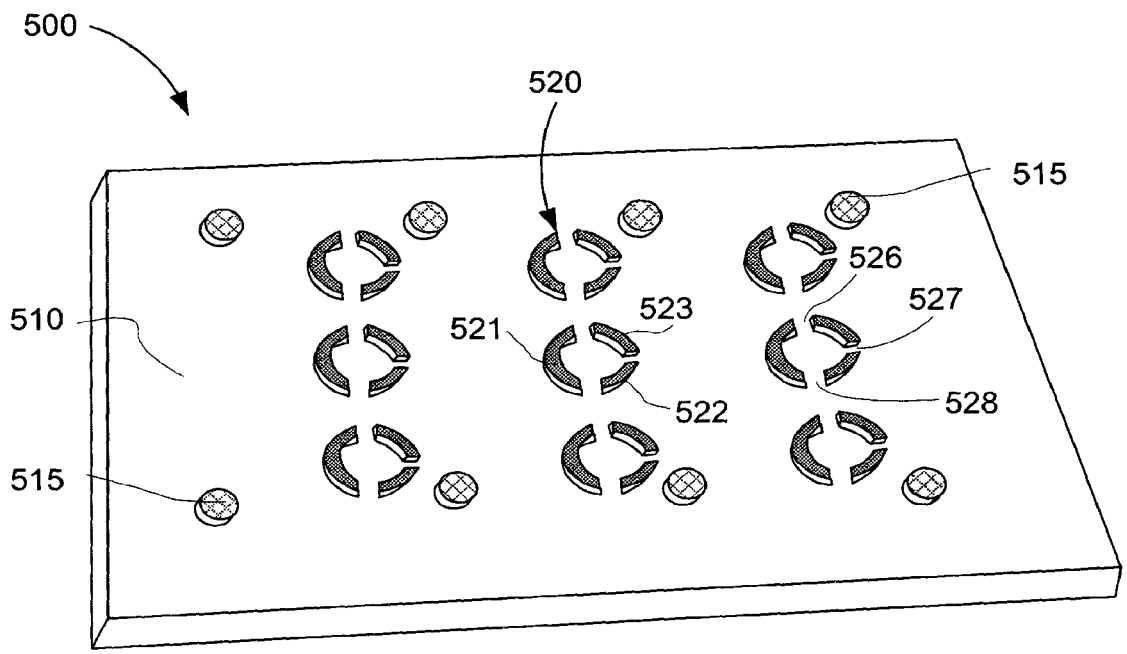
FIG. 5A illustrates an upper sealing head configured to perform a first stage of sealing according to one exemplary embodiment.
Figure 5B:
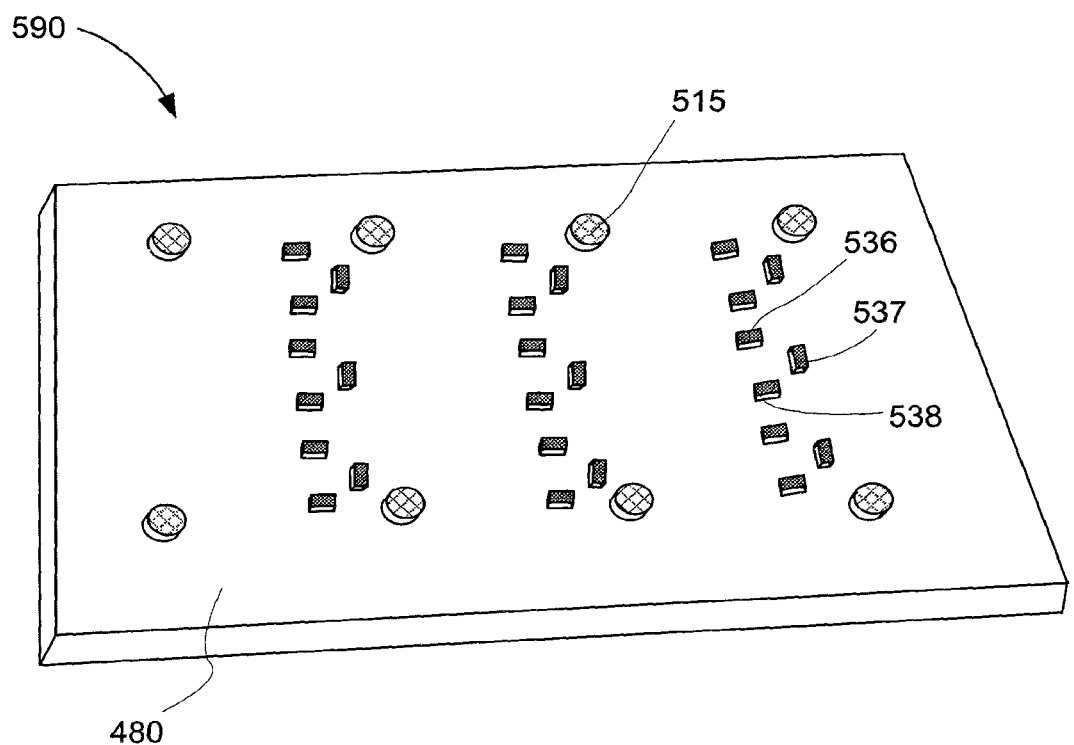
FIG. 5B illustrates an upper sealing head configured to perform a second stage of sealing according to one exemplary embodiment.

FIGS. 5A and 5B illustrate an alternative embodiment of a first stage upper sealing head (500) and a second stage upper sealing head (590). Many alternative embodiments are possible in light of the present teachings. As has been previously iterated, a first stage of sealing seals a top layer of packaging around a perimeter of a boat formed in a bottom layer of packaging. FIG. 5A illustrates an upper sealing head (500) comprising a platform (510) with alignment tabs (515). A lower sealing head (not shown) may have corresponding indentations to ensure accurate alignment. The platform (510) is configured with raised sealing platforms (521-523). The sealing platforms (521-523) may be heated. Consequently, substantial heat may be imparted on the packaging material and its contents during the first stage of sealing. The gaps (526-528) allow fluids (e.g., expanding gasses and liquids) to escape during the sealing and packaging process.

Following the first stage of sealing, one or more subsequent stages may be utilized to complete the seal and close the gaps (526-528). FIG. 5B illustrates a second stage upper sealing head configured to close all three gaps in one sealing stage. As previously stated, alternative embodiments may close one gap or multiple gaps at a time and therefore require multiple stages of sealing. Furthermore, while it may be readily seen that the finished seal of FIGS. 5A and 5B will be substantially circular, various other shapes are possible.

Returning to FIG. 5B, three raised sealing platforms (536-538) for each contact lens package may correspond to the gaps (526-528). Consequently, after a second stage of sealing using the sealing head (590), a top package layer is completely sealed around the perimeter of a boat of a bottom package layer.

While the sealing heads illustrated in FIGS. 5A and 5B are described as being used for sealing a perimeter of a contact lens package, they may also be used to thermally adhere an internal feature to a pack. For example, an internal disc, sponge, or positioning member (all of which may be generally referred to as an internal feature or a support member) may be adhered to one component of a contact lens package using sealing heads similar to those illustrated in FIGS. 5A and 5B.

FIGS. 6A-6C have previously been discussed briefly, however, a more detailed description in light of the sealing mechanisms is provided. FIG. 6A illustrates a top view of a contact lens package (600). A top package layer (610) is illustrated that covers the entire contact lens package (600). The top package layer (610) is sealed with a seal (615) around the perimeter of the boats (675) to a bottom package layer (650). The top package layer (610) acts as a cover over the boats (675) to capture an aqueous solution and a contact lens within the contact lens package (600). Once packaged, the package of multiple lenses may be cut into individual packaged contact lenses or other desired quantities.

FIGS. 6B and 6C illustrate side and cut-away views, respectively, of the package layers. The top package layer (610) includes a cover portion (625) that extends over the boat (675) and is bonded to the bottom package layer (650) around the perimeter of the boat with a seal (615). The seal (615) may be formed in multiple sealing steps or stages, wherein portions of the seal (615) are formed in each stage. In one example, a seal portion having a gap (e.g., gap 312 shown in FIGS. 3A-3C) may be formed in a first stage that permits escape of fluid during the sealing process, and the gap is filled or closed in a second stage after the fluids are removed. A third stage may include forming a seal between a member held within the boat (675) (e.g., the support disc 306 described with reference to FIGS. 3A-3C) and at least one of the top package layer (610) and bottom package layer (650). The seal (615) may be formed using any desired sealing technique such as, for example, the heated press described above with reference to FIGS. 1 and 2A-2B, laser welding, sonic welding, or infrared (IR) welding. The seal (615) may include portions having different properties or characteristics, such as, for example, different seal strength, shape, size, and location. While the shapes illustrated for the seal (615) are substantially round or rounded squares, any desired shape is possible and easily attained in a similar manner.

By sealing the perimeter of the boat in two or more stages, several advantages may be attained. As has been previously described, because the seal is created using two or more stages, fluids (e.g., energized gasses and liquids) are able to escape during the sealing process. Providing an escape route for gasses and liquids may decrease stresses typically present in traditional manufacturing methods. The present systems and methods may provide a greater assurance of sterility because energy generated by the sealing process will not compromise the seal. Consequently, sometimes debilitating effects of the autoclave may be minimized so the seal is better able to remain intact. Furthermore, the reduction in thermal and other stresses allows for the use of less robust packaging materials, the use of lighter/thinner seal areas, and the ability to protect the internals of the package via reduced stresses.

Specifically, packaging graphics and appearance may be improved since the thermal expansion and contraction of the materials is minimized. The polymers within the packaging materials may be better protected from negative thermal effects, allowing alternate primary packaging materials to be used. In addition, thinner, less robust materials may be used, as the sealing process does not impose as much stress on the material as in traditional systems and methods. Further, lower cost packages and more environmentally friendly packages are possible using the present system and method because of the increased latitude in packaging materials. Additionally, because of the increased security in the seal integrity, lower seal forces and lesser seal widths may be used to successfully seal the pack, thus rendering the package easier to open without compromising its hermetic integrity.

As has been previously mentioned, typical blister packs used for packaging contact lenses consists of a polypropylene boat and a multi-layer film comprising, for example, polyethylene, aluminum, a bonding agent, and polypropylene as a cover. The boat is typically an injected mold plastic capable of limited elastic deflection. The boat is usually filled with a sterile saline solution configured to receive a single contact lens. Traditional methods of sealing the multi-layer film to the boat require the boat to comprise a relatively large volume to reduce the thermal effects on the contact lens. That is, the heat generated is often absorbed by the aqueous solution surrounding the lens. The amount of solution must be sufficient to prevent the sealing process from overheating the contents of the package.

The present system and method provide a multi-stage sealing process that limits the thermal effects of the sealing process on the contact lens and thereby allows alternative materials to be used as well as lower volume boats or lens receptacles. Specifically, foil-on-foil packaging may be performed using the systems and methods described herein. The incorporation of traditional packaging system on foil-on-foil packaging would result in a low assurance of sterility due to high manufacturing induced stresses. The presently described systems and methods allow for thin film foil-on-foil packaging (i.e. <30 microns in thickness).

Figure 7:
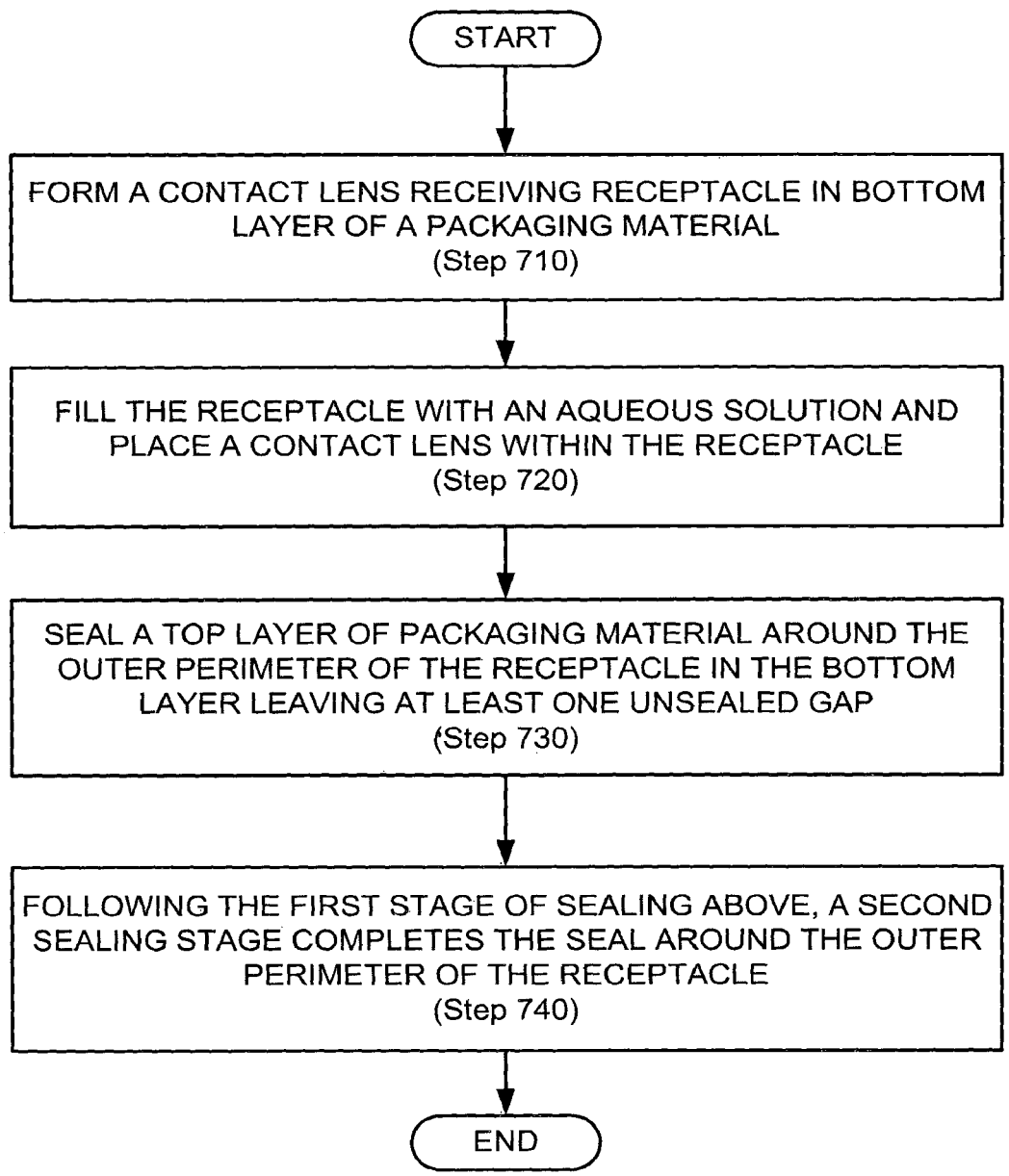
FIG. 7 is a flow chart illustrating a method for sealing a contact lens package in multiple stages to reduce thermal damage and increase sterility assurance according to one exemplary embodiment.

FIG. 7 is a flow chart illustrating one exemplary method of sealing a contact lens packaging in multiple stages. A first step (Step 710) comprises forming a contact lens receiving receptacle in a bottom packaging material. According to various embodiments the receptacle is preformed during the initial manufacture of the bottom packaging material. According to alternative embodiments, the receptacle may be formed using a vacuum or a press using, for example, the sealing heads described herein. The receptacle is filled with an appropriate aqueous solution and a contact lens is placed therein (Step 720). A top layer of packing material is sealed around the outer perimeter of the contact lens receiving receptacle leaving at least one unsealed gap in the seal (Step 730).

The gap(s) in the seal allow excess fluids (e.g., expanding gasses and aqueous solution) to escape. The gaps may help reduce the thermal and expansive forces on the seals and packaging materials typically present in contact lens packaging. Successive stages of sealing close the at least one gap created during the first stage of sealing. A subsequent stage of sealing completes the seal by bonding the top layer of packing material to the bottom layer of packaging material where the gaps were left in the perimeter of the lens receiving receptacle (Step 740).

The contact lens is now sealed within a relatively small lens receiving receptacle that is filled with an aqueous solution. Many of the advantages described above may be attained because the thermal effects have been minimized during the sealing process. The contact lens package is now ready for autoclaving and/or other sterilization processes.

Other example methods are directed to sealing a contact lens within a package in multiple stages and related systems configured to perform such methods. By creating the seal in multiple stages, expanding gases are released to limit strain to the package. Consequently, as the package is subjected to limited strains (e.g., thermal strains), a higher sterility assurance is attained, thinner and/or thermally sensitive materials (e.g., foils) may be used, and smaller packages may be created fewer incidence of thermal damage to the lens during the sealing process.

According to one exemplary embodiment, a heated press is used to create a seal between a top portion and a bottom portion of a contact lens package in multiple stages. A top portion of the contact lens package may be sealed only partially to a bottom portion of a contact lens package in a first stage. In a subsequent second stage, the seal between the top and bottom portions is completed. In the first sealing stage, a significant majority of the seal between the top and bottom portions may be created leaving only a small portion unsealed. The heat and pressure generated during the first stage of sealing is released through the unsealed portion. The second stage seals the remaining relatively small area and therefore limits any thermal impact the packaging.

According to another exemplary embodiment, a heated press has an upper sealing member and a lower sealing member. Both the upper and lower sealing members may be fitted with sealing heads that directly contact top and bottom portions of a contact lens packaging. As the upper and lower members of the heated press are brought together, the top portion of the contact lens package is bonded to an outer perimeter of the bottom portion of the contact lens package. The seal created by this bond is only partial, leaving at least one portion of the outer perimeter of the bottom portion unsealed. A second stage of sealing, utilizing a second sealing head, completes the seal.

In another embodiment, a first stage seals all but a small portion of the top and bottom portions together thus allowing expanding gases to escape through an unsealed gap (or gaps). The second stage closes the gap by completing the seal between the top and bottom portions. The second stage sealing may also be used to create a stronger seal than the preceding seal and thus create a foil "lock" effect. The foil "lock" effect restricts, during the pack opening process, the top portion (e.g., the foil) from being inadvertently pulled off the bottom portion (e.g., the boat) in a way that spills or discharges the contents out of the pack. This second or "lock" seal is typically positioned at an end of the package that is opposite to that part of the package to be opened and may be achieved by a controlled and increased use of heat, pressure, or a combination of the two during the sealing process.

A heated press may be used to create the seals during the first and the second stages. Specifically, a heated sealing head may be configured to provide pressure and heat around the outer perimeter of the bottom portion of the contact lens package. The pressure and heat provided by the heated sealing head may cause the top film layer to bond with the outer perimeter of the bottom portion of the contact lens package. Alternatively, heat may be used to create the seal, exclusive of pressure, or vice versa. Other sealing methods may utilize other forms of energy application including, but in no way limited to, the application of ultrasonic, radio frequency (RF), or infrared (IR) energy.

According to various embodiments, the present exemplary contact lens packaging systems and methods are used in creating a foil-on-foil package. That is, while the presently disclosed system and method is applicable to any number of contact lens packaging such as traditional blister packs used by contact lens manufacturers, the present disclosure may also provide for improved sealing of lower volume foil only packages. Specifically, a foil bottom portion of the package may be pre-formed, or formed prior to sealing by a pre-forming head or a lower sealing head to create a contact lens receptacle (e.g., the boat). Alternatively the foil bottom may be left unformed. The foil bottom is then dosed with sufficient aqueous solution and a contact lens is placed therein.

During a first stage of sealing a foil cover is sealed to the boat around an outer perimeter of the boat leaving only a small portion unsealed. Expanding gases or, if desired, liquids may escape through the unsealed portion minimizing the thermal effects of the sealing process. A second stage of sealing completes the seal to enclose the contact lens and aqueous solution within the foil-on-foil packaging. Traditional methods of sealing the top and bottom layers are less compatible with foil-on-foil packaging. Traditional packaging may significantly benefit from this method of sealing as well.

Benefits of the present methods of sealing include, for example, improving foil-on-foil packaging of contact lenses, providing smaller and lower volume packages, packaging graphics and package appearance improvements, providing thinner packaging, reduced stress on packaging materials and contents, reducing stress on a seal of the packaging resulting in a higher sterility assurance, reducing costs, and the ability to use more sensitive or less robust ingredients.

The preceding description has been presented only to illustrate and describe embodiments of the principles described herein. It is not intended to be exhaustive or to limit the disclosure to any precise form. The principles described herein may be practiced otherwise than is specifically explained and illustrated without departing from their spirit or scope. For example, the principles described herein may be implemented in a wide variety of packaging systems; however they are particularly pertinent to the precision and accuracy required during contact lens packaging. It is intended that the scope of the present exemplary system and method be defined by the following claims.

What is claimed is:

1. A method for manufacturing a contact lens package, comprising:
    providing a first package layer and a second package layer that define a lens receiving area therebetween;
    forming a first seal portion between the first and second package layers around all but a portion of a periphery of the lens receiving area; and
    forming a second seal portion between the first and second package layers to completely seal the lens receiving area.

2. The method of claim 1, wherein forming the second seal portion includes overlapping the second seal portion with the portion of the periphery of the lens receiving area not included in the first seal portion.

3. The method of claim 1, wherein forming the second seal portion includes forming the second seal portion with a greater seal strength than a seal strength of the first seal portion.

4. The method of claim 1, wherein forming the first seal portion includes creating a releasable seal between the first and second package layers.

5. The method of claim 1, wherein forming the second seal portion includes creating a permanent seal between the first and second package layers.

6. The method of claim 1, wherein forming the second seal portion includes applying at least one of a greater heat and a greater pressure than applied when forming the first seal portion.

7. The method of claim 1, further comprising removing gases from the lens receiving area before forming the second seal portion.

8. The method of claim 1, further comprising positioning a contact lens and at least one liquid in the lens receiving area before forming the first and second seal portions.

9. The method of claim 1, further comprising providing an internal member disc positioned in the lens receiving area, and forming a third seal portion between the internal member and at least one of the first and second package layers.

10. A method of manufacturing a contact lens package, comprising:
    positioning a first package layer on a first press portion;
    positioning a contact lens on the first package layer;
    positioning a second package layer on the first package layer and covering the contact lens;
    creating a first seal portion between the first and second package layers with a second press portion; and
    creating a second seal portion between the first and second package layers with a third press portion;
    wherein creating the second seal portion includes creating the second seal portion as a permanent seal between the first and second package layers.

11. The method of claim 10, wherein the first package layer includes a preformed lens receiving area, and positioning the contact lens includes positioning the contact lens in the lens receiving area.

12. The method of claim 10, wherein the first and second seal portion have different properties.

13. The method of claim 10, wherein creating the first seal portion includes creating the first seal portion as a releasable seal between the first and second package layers.

14. The method of claim 10, wherein creating the second seal portion includes applying at least one of a greater heat and a greater pressure as compared to a heat and pressure used to create the first seal portion.

15. The method of claim 10, further comprising applying a vacuum to align the second package layer with the first and second press portions.

16. The method of claim 10, further comprising removing gas from the lens receiving area before creating the second seal portion.

17. The method of claim 10, further comprising positioning a support disc adjacent to the contact lens between the first and second package layers, and forming a third seal portion between the support disc and at least one of the first and second package layers.

18. A method of assembling a contact lens package, comprising:

arranging a first foil package layer and a second foil package layer at least partially overlapping each other with a contact lens positioned there between;

creating a first sealed portion between the first and second foil package layers; and creating a second sealed portion between the first and second foil package layers.

19. The method of claim 18, wherein the contact lens is positioned in a lens receiving area defined between the first and second foil package layers, and creating the first sealed portion includes sealing around all but a gap portion of a periphery of the lens receiving area, and creating the second sealed portion includes sealing the gap portion.

20. The method of claim 18, wherein creating the second sealed portion occurs after creating the first sealed portion.

21. The method of claim 18, wherein creating the first sealed portion includes creating a releasable seal between the first and second foil package layers, and creating the second sealed portion includes creating a permanent seal between the first and second foil package layers.

22. The method of claim 18, further comprising positioning a support member between the first and second foil package layers and in contact with the contact lens, and creating a third sealed portion between the support member and at least one of the first and second foil package layers.

\* \* \* \* \*